United States Patent [19]

Kersenbrock

[11] Patent Number: 4,801,813
[45] Date of Patent: Jan. 31, 1989

[54] EVENT DISTRIBUTION AND COMBINATION SYSTEM

[75] Inventor: Michael D. Kersenbrock, Aloha, Oreg.

[73] Assignee: Tektronix, Inc., Beaverton, Oreg.

[21] Appl. No.: 40,971

[22] Filed: Apr. 21, 1987

Related U.S. Application Data

[63] Continuation-in-part of Ser. No. 830,596, Apr. 17, 1986.

[51] Int. Cl.$^4$ .............................................. H02J 1/00
[52] U.S. Cl. ........................................ 307/40; 307/38; 290/40 R; 340/310 R; 340/825.06; 365/239
[58] Field of Search ............... 364/135, 136, 173, 177, 364/422, 494, 551, 492, 164, 717; 340/825.65, 825.69, 870.13, 521, 657, 676, 825.06, 825.11, 825.14, 825.16, 310 T; 60/39.281, 39.27, 646; 346/20, 60; 365/239; 376/287, 283, 293, 256, 255, 207, 209, 215, 216, 217, 240, 242, 245, 251, 250, 259; 290/2, 4 R, 40 R, 40 C; 370/83, 62, 97, 13, 14, 94, 93, 104, 80; 307/35–41; 375/83, 87, 96, 106, 109, 110, 119

Primary Examiner—William M. Shoop, Jr.
Assistant Examiner—Paul Ip
Attorney, Agent, or Firm—Daniel J. Bedell; Robert S. Hulse

[57] ABSTRACT

An apparatus for generating a trigger signal in response to a selected pattern of events includes event synchronizers for generating synchronized event signals of states indicating the current state of each event on the falling edge of each pulse of a clock signal. A programmable encoder provides a set of event encoding signals of states set according to selected patterns of synchronized event signal states. A set of bus drivers actively drives the potential of each conductor of a bus high on the falling edge of each clock signal pulse and actively drives the potential of selected conductors of the bus low on the rising edge of each clock signal pulse, the conductors being selected according to the pattern of event indicating signal states generated by the encoder. A set of signal detectors produces output signals of states indicating whether the potential of each conductor has been driven low since the last rising edge of each clock signal pulse, and a programmable decoder supplies a trigger initiating signal on detection of selected patterns of signal detector output signal states. A trigger synchronizer generates the trigger signal of state set according to the current state of the trigger initiating signal on the rising edge of each clock pulse.

12 Claims, 4 Drawing Sheets

EVENT DISTRIBUTION AND COMBINATION SYSTEM

This application is a continuation-in-part of prior U.S. patent application Ser. No. 830,596, filed Apr. 17, 1986, entitled "Event Distribution and Combination System".

BACKGROUND OF THE INVENTION

The present invention relates in general to electrical control systems and in particular to an apparatus for logically combining, synchronizing and distributing event detection signals for triggering purposes.

Electrical control systems typically employ sensors to produce digital indicating signals on detection of various external events. The indicating signals are then logically combined to produce triggering signals to control triggerable devices. Complex systems may employ many such event detectors to provide the necessary information to control many devices. Often, however, it is not possible to mount event detectors and trigger control circuitry in the same equipment module, such as the same circuit board, and extensive wiring between equipment modules is necessary to interconnect event detection and trigger control circuitry. Further, events and triggers are often synchronous signals within an equipment module with each module having its own independent clock, and it is difficult to synchronize events and triggers associated with different equipment modules.

Multiplexing systems have been developed to reduce the amount of interconnect wiring between equipment modules by converting parallel control signals generated in any one equipment module to serial data for transmission over a single wire pair to remote modules. Such multiplexing has been effective particularly in reducing interpanel wiring between equipment racks in large control systems. However, parallel-to-serial multiplexing systems employ complex circuitry, do not lend themselves to interconnecting triggering signals between many small equipment modules such as circuit boards, and are often unsuitable for high speed operation.

What is needed is a means for interfacing event detectors and triggerable devices mounted on separate equipment modules so as to minimize the interconnecting wiring needed, and for synchronizing differently clocked events and triggers.

SUMMARY OF THE INVENTION

In accordance with the present invention, an event distribution and control system permits one or more triggerable devices to be triggered according to a logical combination of triggering events. The system comprises a set of equipment modules, each of which may contain one or more event logic units, and/or one or more trigger logic units. An "interim function bus", comprising parallel data lines for carrying event data, and a line carrying a system clock signal, interconnect all of the equipment modules in parallel.

Each event logic unit responds to one or more signals produced by event detectors indicating when an event has occurred. Each event indicating signal is applied as input to a separate event synchronizer included in the event logic unit, and each event synchronizer generates a synchronized event signal representing the state of its input event indicating signal as of the moment the system clock signal last went low. Each even logic unit also includes one or more encoding circuits, each for generating a set of event encoding signals, the state of each event encoding signal being determined according to a logical combination of states of synchronized event signals produced by various event synchronizers of the logic unit. A set of bus drivers are also included in each event logic unit, each event encoding signal being applied as an input to a separate one of the bus drivers. Each bus driver actively drives one of the data lines on the interim function bus high when the system clock signal is low and actively drives the line low only when its input event encoding signal is low and the system clock signal is high.

Each triggering logic unit includes a set of signal detectors, each generating an output signal indicating whether a corresponding data line of the interim function bus went low since the rising edge of the last system clock pulse. A decoding circuit included in each trigger logic unit produces a trigger initiating signal of state determined according to a logical combination of states of signal detector output signals. A trigger synchronizer, also included in each triggering logic unit, generates a trigger signal of state determined according to the state of the trigger initiating signal at the moment the system clock signal last went high. The trigger signal may be generated asynchronously or may be synchronized to a clock signal produced by a triggerable device.

The encoding and decoding circuits which determine what combinations of events are to produce a particular trigger signal are programmable to permit triggering in response to selected combinations of events. The use of such distributed programmable encoding and decoding circuits interconnected by a relatively few parallel data lines provides flexibility in relating events to triggering without requiring either large numbers of parallel interconnecting lines or serial data transmission between equipment modules. In addition, the event synchronizers, bus drivers, signal detectors and trigger synchronizers on each module, which all respond to the same system clock signal, operate in a "pipelined" fashion such that the system may begin responding to a change in the state of events before it has completed responding to a previous change in the state of events, thereby accomplishing fast response. In particular, the use of the bus drivers to actively drive the data lines both up and down permits encoded triggering data to be rapidly transmitted between modules even when the data lines have significant inherent capacitance which must be charged or discharged in order to change the state of signals on the lines.

It is accordingly an object of the present invention to provide an improved event distribution and combination system to generate trigger signals on occurrence of selected combinations of event detection signals.

It is another object of the present invention to provide an event distribution and combination system which minimizes the amount of interconnection wiring needed to interface event detectors and triggerable devices.

It is still another object of the present invention to provide an event distribution and combination system which may be rapidly and easily programmed and reprogrammed to produce trigger signals in response to selected combinations of events.

It is a further object of the present invention to provide an event distribution and combination system for providing synchronization of event detection signals to a system clock and for providing synchronization of triggering signals to the clocks of triggerable devices.

It is yet another object of the present invention to provide an event distribution and combination system for providing high speed transmission of encoded triggering data between separate equipment modules.

The subject matter of the present invention is particularly pointed out and distinctly claimed in the concluding portion of this specification. However, both the organization and method of operation of the invention together with further advantages and objects thereof may best be understood by reference to the following description taken in connection with accompanying drawings wherein like reference characters refer to like elements.

DRAWINGS

Figure 1:
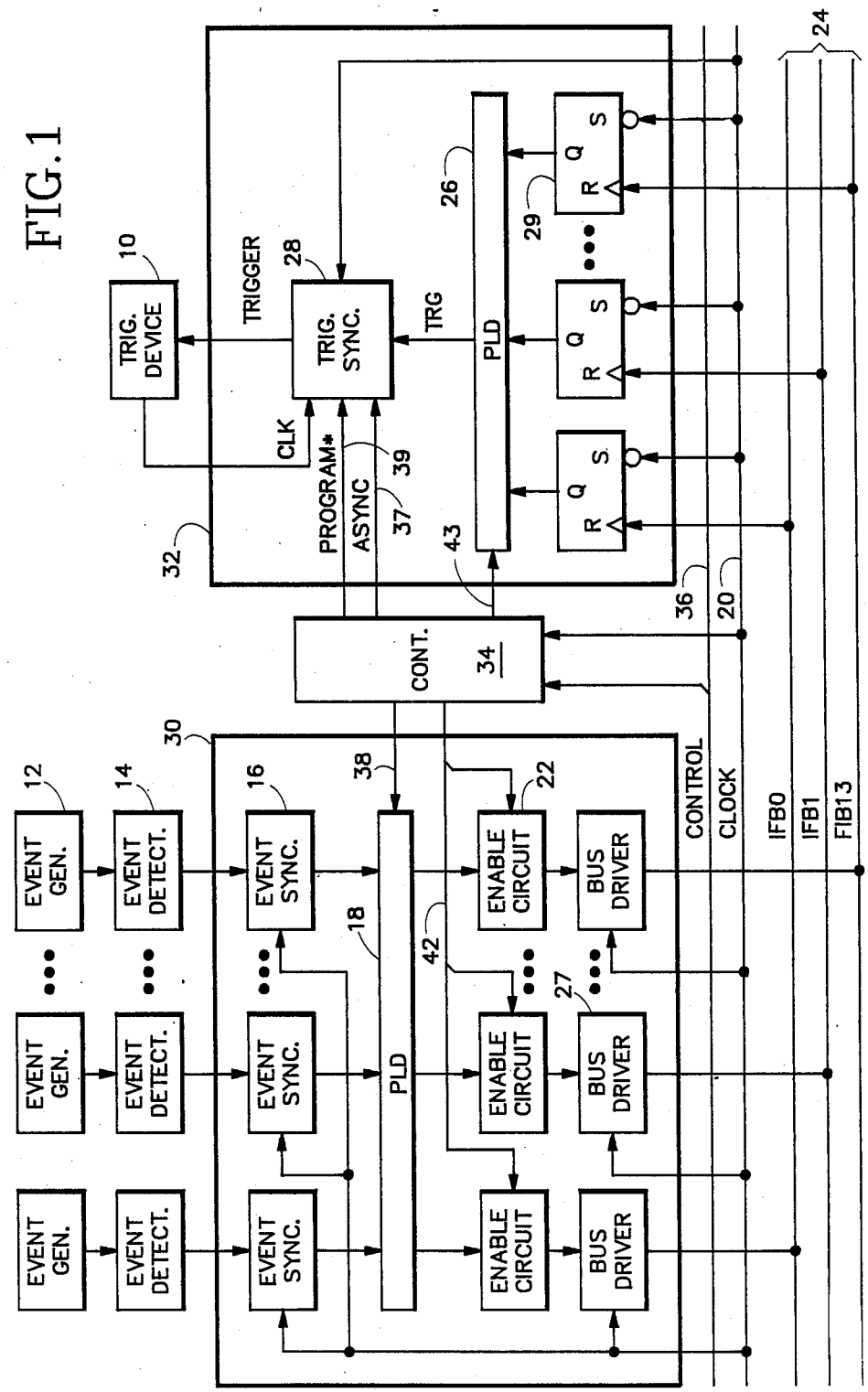
FIG. 1 is a block diagram of an event distribution and combination system in accordance with the present invention.
Figure 7:
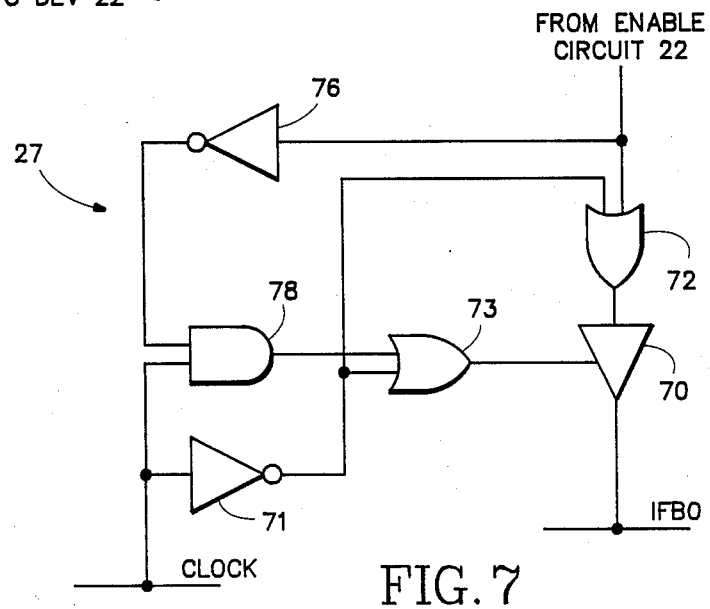
Figure 4:
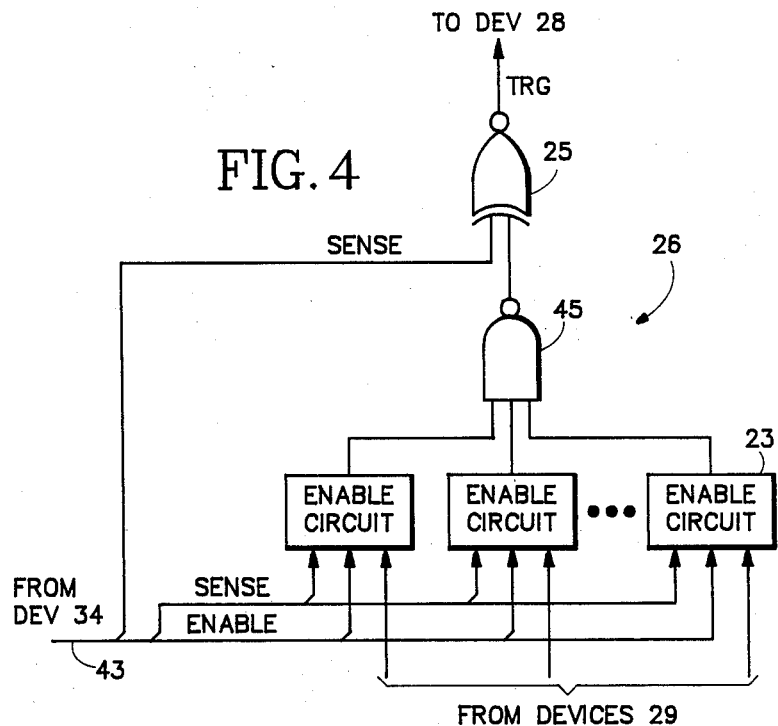
Figure 5:
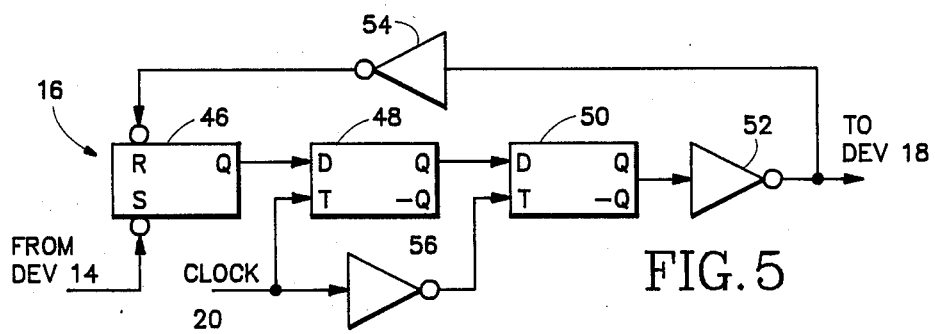
Figure 6:
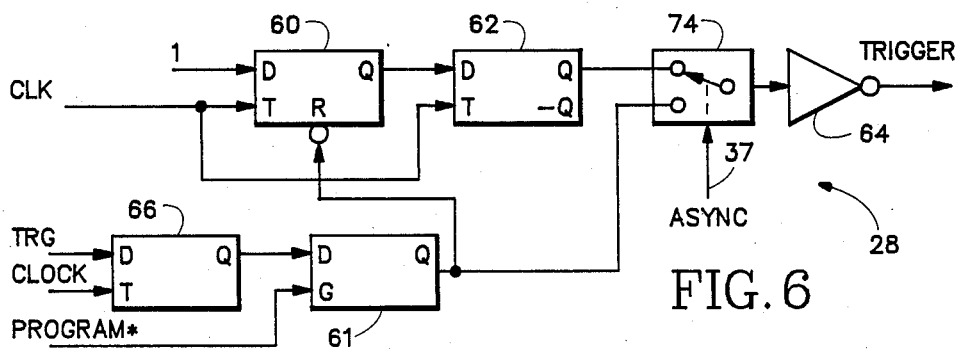

FIG. 4 a block diagram of a portion of the programmable logic device of the trigger logic unit of FIG. 1;

FIG. 5 is a block diagram of one of the event synchronizers of FIG. 1;

FIG. 6 is a block diagram of one of the . trigger synchronizers of FIG. 1;

FIG. 7 is a block diagram of a bus driver of FIG. 1; and

Figure 8:
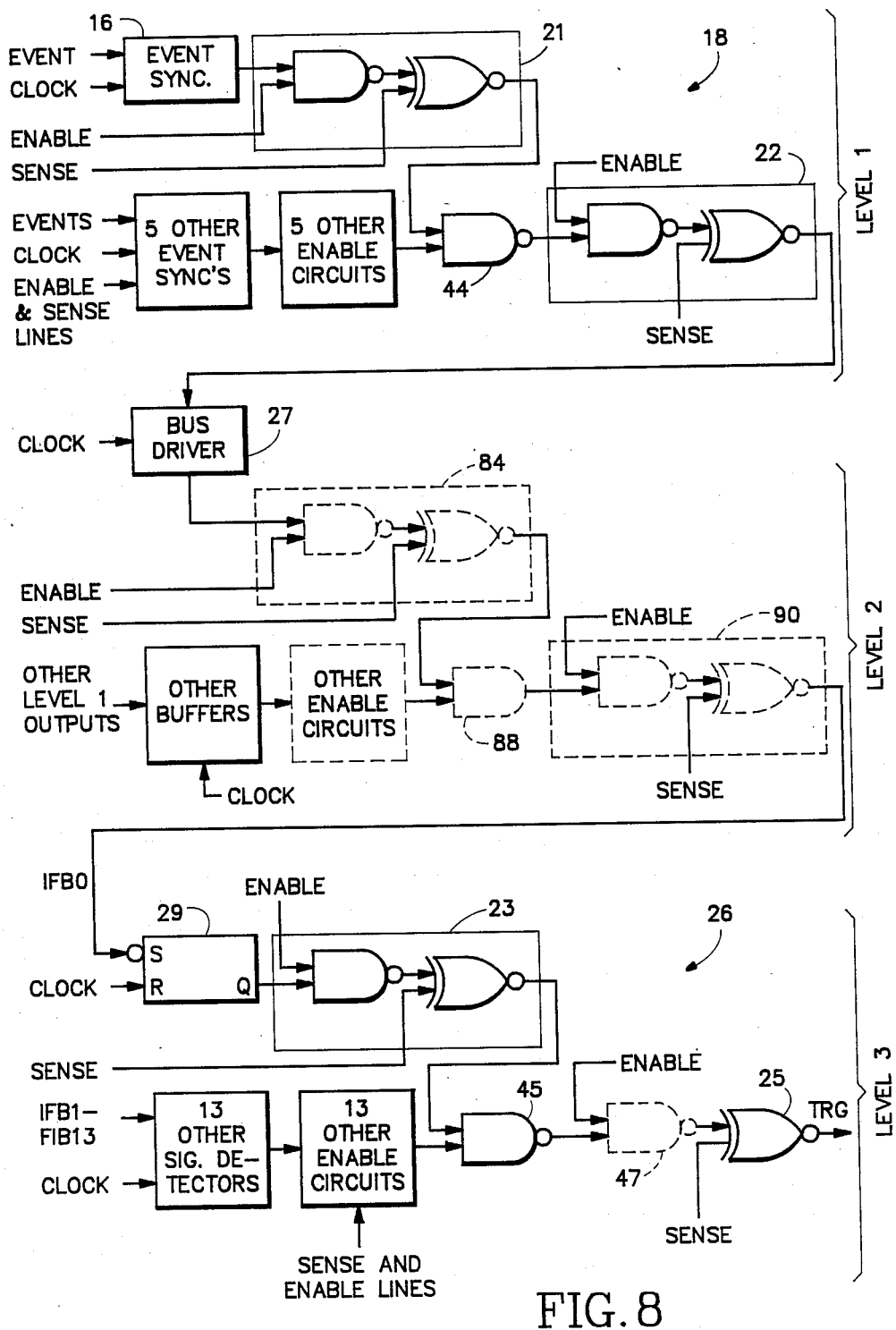

FIG. 8 is a block diagram illustrating the levels of programmability of the event combination and distribution system according to the present invention.

DETAILED DESCRIPTION

Referring to FIG. 1, an event distribution and combination system, illustrated in block diagram form, is adapted to transmit one or more triggering signals (TRIGGER) to one or more triggerable devices 10 in response to predetermined patterns of input event indicating signals generated by a set of event detectors 14 according to events occurring in event generating devices 12. The present invention minimizes the amount of wiring required to interface event detectors 14 and triggerable devices 10 in applications where the event detectors and triggerable devices are mounted on or accessed through several separate equipment modules, such as circuit boards. The present invention also synchronizes event detection and triggering communication between modules when the modules operate under independent clocks.

The event distribution and combination system includes one or more event logic units 30 and/or one or more trigger logic units 32 mounted on each equipment module. One controller 34 is also mounted on each module and all of the event logic units 30 and trigger logic units 32 on every module in the system are interconnected in parallel by an "interim function" bus (IFB) 24 comprising a set of 14 lines for carrying encoded information between modules. A system clock line 20 is also provided to each module and carries a binary system clock signal (CLOCK). The system CLOCK signal on clock line 20 may be provided by any suitable source of periodic clock pulses and may be independent of clocks used to time the operation of any event generator 12 or triggerable device 10. FIG. 1 shows only a single equipment module having a single event logic unit 30 and a single trigger logic unit 32 connected to the IFB 24. However, it is understood that a module may have more than one event logic unit 30 and more than one trigger logic unit 32, and that many such modules may be connected to the IFB 24 in a given control system.

Each event logic unit 30 monitors the event indicating signals produced by up to six event detectors 14 and may be programmed to place selected patterns of signals on the interim function bus 24 in response to one or more particular patterns of input event indicating signals. Each trigger logic unit 32 monitors the states of the IFB 24 lines and may be programmed to generate its output TRIGGER signal following detection of one or more selected bit patterns on the IFB 24. The controllers 34 on each module provide signals for programming the pattern generation and recognition operation of the event logic units 30 and trigger logic units 32 on the module. Each controller 34 is accessed by a control bus 36 which carries programming data to the controller 34 from an external operator interface device, such as a microcomputer system.

The present invention minimizes the amount of intermodule wiring required to coordinate input events with output trigger signals by making efficient use of the interim function bus 24 which is capable of carrying many different bit patterns. Each event logic unit 30 can be programmed to produce any particular bit pattern in response to selected patterns of input event indicating signals, and each trigger logic unit 32 may be programmed to produce a TRIGGER signal in response to any bit pattern on the interim function bus. By appropriately preprogramming of the event and trigger logic units, the event distribution and combination system can coordinate many event/triggering actions involving many separate equipment modules using only the 14 interconnecting data lines of the IFB 24.

Each event logic unit 30 comprises six event synchronizers 16 for receiving output signals from event detectors 14, one programmable logic device (PLD) 18, fourteen enable circuits 22, and fourteen bus drivers 27. The system CLOCK signal on line 20 and a separate one of the event indicating signals produced by the event detectors 14 are connected as inputs to each event synchronizer 16, and each event synchronizer 16 produces an output "synchronized" event signal indicating the state of its input event indicating signal as of the moment the system CLOCK signal was last driven low. The synchronized event signal output of each event synchronizer 16 is provided as an input to PLD 18. PLD 18 transmits a separate output signal to each of the fourteen enable circuits 22, the state of each PLD output signal being set in response to a selected pattern of synchronized event signal states from event synchronizers 16. The relationships between PLD 18 input signal patterns and output signal states are determined by programming control signals supplied on control lines 38 to PLD 18 from controller 34.

Each enable circuit 22 has a single binary "event encoding" signal output provided as an input to a separate one of the fourteen bus drivers 27. The output of each bus driver 27 is connected to one of the 14 data lines (IFB0–IFB13) of the interim function bus 24. Each enable circuit 22 has four operating modes, and the mode of operation is determined by control lines 42 from controller 34. In one mode of operation, the enable circuit 22 produces an output of the same state as its input, while in a second mode of operation the enable circuit inverts its input to produce its output. In a third operating mode, the enable circuit 22 maintains its output continuously low regardless of the state of its input signal, while in a fourth mode the enable circuit maintains its output continuously high irrespective of the state of its input signal.

Each bus driver 27 has two operating modes, the current mode being selected according the state of the system CLOCK signal on clock line 20 providing a control input to each bus driver. In one operating mode, selected when the system CLOCK signal is low, each bus driver 27 actively drives the IFB 24 line to which it is connected to a high logic level. In another operating mode, selected when the system CLOCK signal is high, each bus driver actively drives the IFB 24 line to which it is connected to a low logic state, provided, however, that its event encoding input signal is also low. If the event encoding input signal to a bus driver 27 is high when the system GLOCK signal is high, the bus driver output does not affect the potential of the IFB line.

All fourteen lines of IFB 24 are coupled to each trigger logic unit 32 in the system, and each triggering logic unit 32 includes a programmable logic device (PLD) 26, a trigger synchronizer 28 and fourteen signal detectors 29. Each signal detector 29 suitably comprises an RS flip-flop having a level sensitive inverting set input (S) connected to system clock line 20, an edge triggered reset (R) input connected to a separate line of IFB 24, and an output signal (Q) providing an input to PLD 26. PLD 26 produces an output trigger initiating signal (TRG) in response to one or more selected patterns of output signal states from the signal detectors 29, pattern selection being determined according to control data on control lines 43 from controller 34 to PLD 26. The TRG signal produced by PLD 26 is applied as input to trigger synchronizer 28 which detects the state of the TRG signal each time the system CLOCK signal on line 20 is driven high and subsequently sets the state of its TRIGGER signal output according to the detected state of the TRG produced by PLD 26. The TRIGGER signal is transmitted to triggerable device 10 and when triggerable device 10 operation is synchronized to its own clock, the trigger synchronizer 28 adjusts the TRIGGER signal state on the leading edge of the first pulse of a clock signal (CLK) provided by the triggerable device 10 following each detection of the TRG signal. However, when triggerable device 10 operates asynchronously, an "ASYNC" signal on a control line 37 from controller 34 to the trigger synchronizer 28 causes the trigger synchronizer to immediately adjust the state of its TRIGGER output signal on each detection of the TRG signal without synchronization to a CLK signal from the triggerable device.

Controller 34 suitably comprises an addressable shift register for storing data from control bus 36. The shift register of controller 34 provides a parallel set of output bits on control lines 37, 38, 42 and 43 after receiving the same set of bits on a data line of control bus 36. The shift register in controller 34 is loaded one bit at a time as it receives system CLOCK pulses on clock line 20 when input enabled by a signal on another line of control bus 36.

Since the parallel control data output of controller 34 continuously changes during reprogramming, each programmable device in the system passes through a succession of interim states wherein the device has unintended input/output relationships which can lead to generation of unexpected TRG signals. By freezing the state of the TRIGGER signal output of each trigger synchronizer 28 prior to reprogramming the system, the changes in the TRG signals are prevented from inadvertently triggering any triggerable device. The controller 34 preserves the state of the TRIGGER signal output of each trigger synchronizer 28 of FIG. 1 during reprogramming by driving low a PROGRAM* signal on control line 39 to the trigger synchronizer circuit 28, the PROGRAM* signal being set continuously high when the system is not being reprogrammed. The PROGRAM* signal, which may be the same signal utilized to input enable controller 34, is carried to each controller 34 by control bus 36 and is forwarded to trigger synchronizer 28 on control line 39 by the controller 34.

Figure 2:
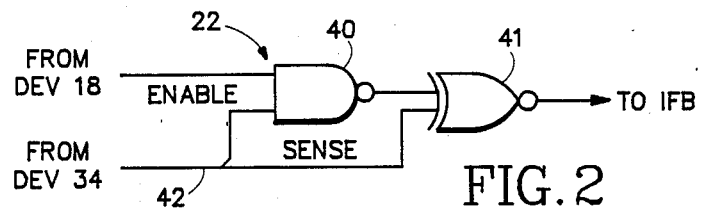
FIG. 2 is a block diagram of the enable circuit of FIG. 1.

FIG. 2 depicts in circuit diagram form an enable circuit 22 of FIG. 1 comprising a NAND gate 40 and an exclusive NOR (XNOR) gate 41. NAND gate 40 has one input terminal for receiving an output signal from PLD 18 and has a second input terminal for receiving an ENABLE signal from controller 34 over one of control lines 42. The output of NAND gate 40 is applied to one input of XNOR gate 41 while a SENSE signal from controller 34 is transmitted to a second input of XNOR gate 41 over a second control line 42. The output of XNOR gate 41 is coupled to one line of IFB 24. When the ENABLE signal from controller 34 is low, the output of NAND gate 40 will be high regardless of the state of the input signal from PLD 18. Therefore, controller 34 can block any effect on the enable circuit 22 output due to the PLD 18 input signal by holding the ENABLE line low. On the other hand, with the enable line from controller 34 high, the state of the NAND gate 40 output will be the inverse of the state of the input signal from PLD 18.

When both inputs of XNOR gate 41 are the same logic level (both high or both low), the gate output is high. When the two inputs are of differing logic levels, the XNOR gate output level is low. Thus when the SENSE signal from controller 34 is high, the output state of XNOR gate 41 will follow the output state of NAND gate 40, and when the SENSE signal from controller 34 is low, XNOR gate 41 will invert the output of NAND gate 40. Therefore, depending on the states of the SENSE and ENABLE control signals applied to enable circuit 22, the output state of circuit 22 may be equal to the state of the data input from PLD 18, may be the inverse of the data input state, or may be high or low regardless of the state of the input data.

Figure 3:
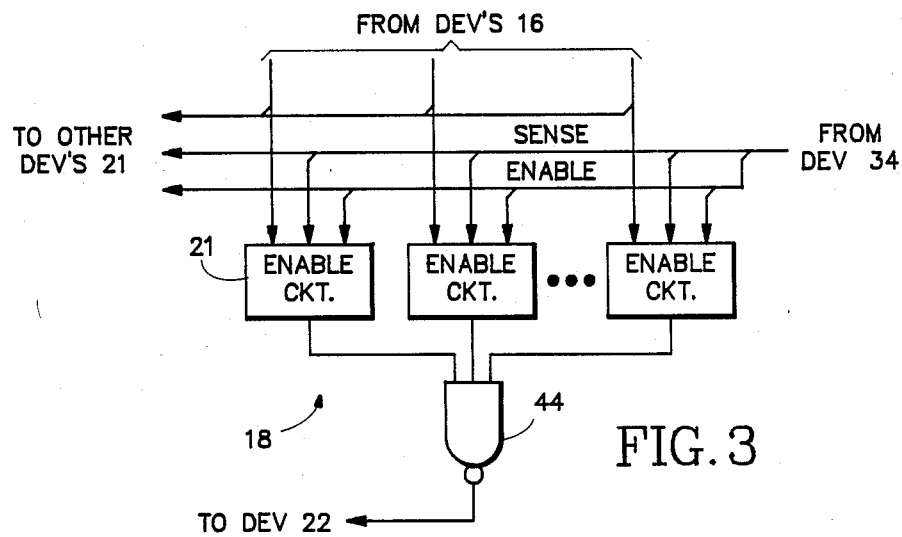
FIG. 3 is a block diagram of a portion of the programmable logic device of the event logic unit of FIG. 1.

FIG. 3 depicts a preferred embodiment of a portion of programmable logic device 18 of FIG. 1. PLD 18 comprises fourteen NAND gates 44, each summing the outputs of a corresponding set of six enable circuits 21, identical to enable circuits 22 of FIG. 2. Only one NAND gate 44, and its associated set of enable circuits 21, are shown in FIG. 3. Each enable circuit 21 of each set receives the output of one of the six event signals from synchronizers 16 of FIG. 1, the output of any one event synchronizer 16 being tied in common to the input of one enable circuit associated with each of the fourteen NAND gates 44. Enable circuits 22 permit controller 34 to program PLD 18 by controlling the states of the ENABLE and SENSE control lines to each enable circuit 21 such that each enable circuit 21 may selectively pass, invert or block signals from an associated event synchronizer 16, selectively applying either a high or a low voltage to the associated input of any NAND gate 44 when the event signals are blocked. Therefore, PLD 18 can be programmed to produce an output signal of a selected state on occurrence of any selected pattern of data signals from six event synchronizers 16.

Programmable logic device 26 of trigger logic unit 32 of FIG. 1, depicted in more detailed block diagram form in FIG. 4, comprises a set of fourteen enable circuits 23 similar to previously described enable circuits 22 of FIG. 2, each coupling one signal detector 29 output to one input of a fourteen input NAND gate 45. The output of NAND gate 45 is applied as one input signal to an XNOR gate 25, while a SENSE control signal on control line 43 from controller 34 is applied to another input of the XNOR gate. The output of XNOR gate 25 provides the input signal (TRG) to trigger synchronizer 28. Controller 34 programs PLD 26 to produce a trigger signal of either sense on detection of any selected bit pattern of signal detector 19 outputs by appropriately setting the states of the SENSE and ENABLE signals on lines 43 applied to enable circuits 23 and XNOR gate 25 of PLD 26.

The preferred embodiment of event synchronizer 16 of FIG. 1, depicted in more detailed block diagram form in FIG. 5, comprises RS flip-flop 46, type D flip-flops 48 and 50, and inverters 52, 54 and 56. RS flip-flop 46 output Q is set to a high (logical 1) state when an inverting SET input S of the flip-flop is set to a low (logical 0) level. Flip-flop 46 output Q is reset to a logical 0 when an inverting reset input R is set to a logical 0. Each of D type flip-flops 48 and 50 produces a logical 1 Q output and a logical 0 −Q output whenever a logical 1 appears at its D input on the rising edge of a CLOCK pulse applied to its T input. If the D input is low during a rising edge of the CLOCK pulse, the Q output is reset to 0 and the −Q output is reset to 1.

An input signal from event detector 14 of FIG. 1 is applied to the inverting set input of RS flip-flop 46. The Q output of flip-flop 46 is applied to the D input of flip-flop 48 while the Q output of flip-flop 48 is connected to the D input of flip-flop 50. The −Q output of flip-flop 50 is inverted by inverter 52 and becomes the synchronized event signal provided to PLD 18 of FIG. 1. Also, the output of inverter 52 is in turn inverted by inverter 54 and applied to the inverting reset terminal R of RS flip-flop 46. A CLOCK signal on clock line 20 is connected to the T input of flip-flop 48, and the same CLOCK signal is inverted by inverter 56 and applied to the T input of flip-flop 50. Therefore, flip-flop 48 changes state only on the rising edge of a CLOCK pulse on line 20, while flip-flop 50 changes state only on the falling edge of a CLOCK pulse on line 20.

Assuming that both the set and reset inputs of flip-flop 46 are initially high, that its Q output is low, that the output of the synchronizer at inverter 52 is low, and that the input to flip-flop 46 from event detector 14 is driven low, indicating occurrence of an event, then the Q output of flip-flop 46 latches in the high state. On the next rising edge of a CLOCK pulse on line 20, flip-flop 48 changes state, driving its Q output high. Then, on the falling edge of the next pulse on line 20, flip-flop 50 changes state, driving the −Q output low. The output of inverter 52 goes high, causing inverter 54 to drive the inverting reset input of flip-flop 46 low to reset the Q output of flip-flop 46 when the inverting set input goes high again. If the inverting set input is still low, flip-flop 46 will remain set until the set input does go high. With flip-flop 46 reset, flip-flop 48 rests on the next leading edge of a system CLOCK pulse, causing flip-flop 50 to reset on the falling edge of the next system CLOCK pulse, thereby driving the event synchronizer circuit 16 output at inverter 52 low again.

Thus flip-flop 46 latches on a signal from an event detector 14, while the combination of flip-flops 48 and 50 synchronizes the transmission of an event signal to PLD 18 to the start of the next CLOCK pulse and ensures that the event signal remains high for at least one CLOCK cycle. The signal from event detector 14 need remain on only long enough to set flip-flop 46, and the double clocking of flip-flops 48 and 50 provides protection against metastable input states and provides synchronization of the event indication to the system clock signal.

Trigger synchronizer 28 of FIG. 1, shown in more detailed block diagram form in FIG. 6, comprises type D flip-flops 60, 62 and 66, a transparent latch 61, a switch 74, and a driving amplifier 64 for producing the TRIGGER signal to triggerable device 10 of FIG. 1. The TRG signal from the PLD 26 of FIG. 1 drives a D input of flip-flop 66 which flip-flop is clocked at terminal T by the system CLOCK signal. The Q output of flip-flop 66 is connected to a D input of transparent latch 61, while the PROGRAM* signal on control line 39 from the controller 34 of FIG. 1 controls a G input of latch 61. The transparent latch 61 transfers the state of the signal at its D input to its Q output when the G input is high and freezes the state of its Q output when the G input goes low. Therefore, when the PROGRAM* signal is driven low during a system reprogramming operation, the TRG signal has no effect on the Q output of latch 61, so that the state of the TRIGGER signal remains fixed. The ASYNC signal from controller 34 controls the switching state of switch 74 which connects the Q output of latch 61 to the input of amplifier 64 on assertion of the ASYNC signal on control line 37 applied as a switching control input to switch 74. Thus, when the triggerable device 10 of FIG. 1 is to operate asynchronously, the ASYNC line is asserted and the signal appearing at the Q output of latch 61 is routed immediately to the input of amplifier 64 to initiate the TRIGGER signal output of the amplifier.

The Q output of latch 61 is also connected to an inverting reset input of flip-flop 60, the D input of flip-flop 60 being tied to a logic level "1" source and the T (clock) input of flip-flop 60 being controlled by the CLK signal from the triggerable device. The Q output of flip-flop 60 drives the D input of flip-flop 62, while the CLK signal from triggerable device 10 controls the T input of flip-flop 62. Switch 74 connects the Q output of flip-flop 62 to the input of amplifier 64 when the ASYNC signal on control line 37 is not asserted and the triggerable device 10 of FIG. 1 is to be operated synchronously.

The TRIGGER signal output of amplifier 64 is normally intended to trigger a triggerable device when the TRIGGER signal goes low (i.e. active low). When the synchronous mode of triggering is employed, as long as the Q output signal from flip-flop 66 remains high, the Q outputs of flip-flops 60 and 62 remain high, the output of switch 74 remains high, and the TRIGGER signal remains high. When the Q output signal of flip-flop 66 goes low on the rising edge of a system CLOCK signal, indicating that PLD 26 has driven the TRG signal low, flip-flop 60 immediately resets, driving its Q output low. On the next rising edge of a CLK pulse from the TRG device, flip-flop 62 resets, driving its Q output and the output of switch 74 low causing amplifier 64 to transmit the active low TRIGGER signal to triggerable device 10. As long as the Q output of flip-flop 66, applied to the inverting reset input of flip-flop 60, remains low, trigger synchronizer 28 will continue to generate a low TRIGGER signal to the triggerable device 10. On the next CLK pulse rising edge after the Q output of flip-flop 66 returns to a high state, flip-flop 60 sets. Then, on the next subsequent CLK pulse rising edge, flip-flop 62 sets, driving the Q output of flip-flop 62 and switch 74 output high, thereby turning off (driving high) the TRIGGER signal generated by driver amplifier 64. Thus trigger synchronizer 28 initiates and terminates TRIGGER signals to triggerable device 10 synchronized with the CLK pulses from the triggerable device when the ASYNC signal on control line 37 is held low. Thus when the system is not in a programming mode, the enable terminal G of latch 61 is held at logical "1" so that latch 61 passes the Q output of flip-flop 66 to its Q output. During a programming operation, input terminal G of latch 61 is held low so that its Q output remains fixed.

FIG. 7 shows a typical bus driver 27 of FIG. 1 in more detail. The output of an enable circuit 22 is applied through an OR gate 72 to the input of a buffer 70. The CLOCK signal, inverted by an inverter 71, controls another input of OR gate 72. The output of enable circuit 22, inverted by an inverter 76, and the CLOCK signal are applied as inputs to an AND gate 78. The output of AND gate 78 and the output of inverter 71 drive inputs of an OR gate 73, and the output of OR gate 73 controls an enable input to buffer 70. When the CLOCK signal is low, buffer 70 is enabled by the CLOCK signal via inverter 71 and OR gate 73. The high output of inverter 71 drives the output of OR gate 72 high and in response buffer 70 drives the IFB line high. If the output of enable circuit 22 is low when the CLOCK signal subsequently goes high, the output of AND gate 78 goes high so as to enable buffer 70 via OR gate 73. Since both inputs to OR gate 72 are driven low, the input to buffer 70 is driven low and buffer 70 pulls the IFB line to a low logic level. On the other hand, if the output of enable circuit 22 is high when the CLOCK signal goes high, buffer 70 is not enabled and does not pull the IFB line down.

The event distribution and combination system of the present invention provides three distributed levels of programmable logic, enabling various combinations of events to trigger triggerable devices 10. Each level of programmable logic is designed to synchronize a plurality of binary input signals to the system CLOCK and to produce one or more binary outputs, the state of each output being determined by a selected combination of input signal states. Generally, each level of programmable logic includes a group of synchronizers, bus drivers or signal detectors, a group of enable circuits, a NAND or an AND gate, and an additional enable circuit. Each synchronizer, bus driver or signal detector synchronizes an input signal to the system CLOCK signal. Each enable circuit of the group receive one synchronized input signal and produces an output signal which may be programmed to be of the same or inverse logic level to its input signal, or to be held continuously high or low regardless of the state of its input signal. The outputs of the group of enable circuits are logically combined by the NAND or AND gate and the output of the NAND or AND gate is applied as input to the additional enable circuit. The additional enable circuit may be programmed to cause its output to be constantly high or low, or to follow or invert the NAND or AND gate output signal. In this arrangement, each level of programmable logic may therefore be programed to produce an output signal of either a high or a low state on detection of any desired pattern of input signal states or may be programmed to produce a continuously high or low output signal regardless of the input signal states.

Referring to FIG. 8, depicting the three levels of programmability in block diagram form, the first level of programmability (Level 1) comprises event synchronizers 16, PLD 18, and enable circuits 22 in each module. Each PLD 18 includes fourteen sets of six enable circuits 21, one set associated with each line of the interim function bus, and a NAND gate 44. One such set of enable circuits 21, associated with bus line IFB0 is illustrated in FIG. 8. Each set of enable circuits 21 receives up to six synchronized event signals from event synchronizers 16 and the six outputs of the enable circuits 21 are applied as inputs to NAND gate 44. The output of NAND gate 44 is applied to the input of enable circuit 22 which provides the output signal for the first level of programmable logic. Thus the first level of programmability is capable of driving an output signal high or low in response to any desired combination or input event indicating signal states, or continuously high or low regardless of states of the input events.

For convenience, the discussion of the second level of programmability will follow the discussion of the third level of programmability. The third level (Level 3) of programmability includes every signal detector 29 and every PLD 26 in the system. One PLD 26 and its associated signal detectors 29 are shown in FIG. 8. Each PLD 26 includes a set of fourteen enable circuits 23, each receiving the output of one signal detector 29 as input, a NAND gate 45 for receiving the outputs of the enable circuits 23, and an XNOR gate 25 for receiving the output of the NAND gate 45 and for producing the TRG signal. In an alternative embodiment of the present invention, another NAND gate 47 (shown in dotted line) is inserted between the output of NAND gate 45 and the input of XNOR gate 25 such that NAND gate 47 and XNOR gate 25 comprise a complete enable circuit (with output inverted). With NAND gate 47 in place, PLD 26 can produce a TRG signal of state determined by any combination of states on the IFB0-13 lines or (when the enable signal to NAND gate 47 is held low) which is continuously high or low regardless of the state of the IFB lines. However, this can be also done without adding NAND gate 47 by deasserting all of the enable signal inputs to enable circuits 23. Therefore, NAND gate 47 is omitted from the PLD 18 in the preferred embodiment of the invention without reduction in programming flexibility.

The second level (Level 2) of programmability has all of the outputs of Level 1 (i.e., the outputs of every enable circuit 22) as its inputs and produces all of the inputs to Level 3 (i.e., the bit pattern on IFB 24) as its outputs. Each Level 2 output is of a state which may be determined by the states of a selected combination of several Level 1 outputs, or may be held continuously high or low. Bus drivers 27 synchronize the Level 2 inputs to the rising edge of the system CLOCK signal. In an alternative embodiment of the invention, a set of enable circuits 84 (shown in dotted line in FIG. 8) are provided, each receiving the output of one bus driver 27. The outputs of the enable circuits 84 are provided as inputs to an AND gate 88 (also shown in dotted line), and the output of AND gate 88 is connected to an input of an enable circuit 90 (also shown in dotted line). The output of enable circuit 90 drives one of the IFB lines, in the example of FIG. 8, IFB0. Thus, the second level of programmability can set the state of any one of the IFB lines according to any combination of Level 1 output states from event logic units 30 or can set the IFB line continuously high or low regardless of the event logic 30 output states.

However, since each Level 1 enable circuit 22 is connected in series with a Level 2 enable circuit 84 through a bus driver 27, no loss of programming flexibility occurs when the enable circuit 84 is bypassed because enable circuit 22 can be programmed to produce any desired input to AND gate 88 in response to the output of NAND gate 44. By a similar argument, enable circuit 90 can also be eliminated without loss of programming flexibility since it operates in "series" with Level 3 enable circuit 23 via signal detector 29. Finally, AND gate 88 is eliminated in the preferred embodiment of the invention because the outputs of several bus drivers 27 can be directly connected to an IFB line to provide a "hardwired" AND of these outputs. Thus, while Level 2 programmability "exists" in the preferred embodiment of the invention in the sense that it provides additional flexibility in relating events to triggering signals, the second level of programmability is provided without additional hardware by accounting for the lack of enable circuits 84 and 90 by suitably programming enable circuits 22 and 23, and by hardwire ANDing the outputs of bus drivers 27 onto the IFB bus lines to account for the lack of AND gate 88.

With three levels of distributed programmable logic, the system may be programmed with flexibility to independently trigger many triggerable devices 10 upon occurrence of many possible combinations of events, within limits generally determined by the size of IFB 24. As IFB 24 lines are increased in number, the number of distinguishable bit patterns which can be transmitted by IFB 24 also increases, permitting more devices to be independently triggered at the same time.

It should be noted that programming Level 1 may be bypassed in alternative embodiments of the invention by coupling the output of each of the event synchronizers 16 to the interim function bus through a separate enable circuit 22 and bus driver 27. Similarly, Level 3 may be omitted by connecting the outputs of signal detectors 29 directly to the inputs of trigger synchronizers 28. In either case, triggerable device 10 may be triggered on many selectable combinations of signals from event detectors 14. However, inclusion of Level 1 nd Level 3 programming permits an increase in the efficiency of use of IFB 24 and in the flexibility of the system in permitting simultaneous triggering upon occurrence of various event combinations.

With reference to FIGS. 1, 6 and 8, it can be seen that the synchronizers, bus drivers and a signal detectors incorporated into the event distribution and combination system of the present invention enable the system to act as a form of data processing "pipeline". The event synchronizers 16 supply event indication signals to PLD 18 on the falling edge of the system CLOCK signal. PLD 18 and enable circuits 22 which comprise the first logic level also comprise a first "stage" of the pipeline wherein the event indication signals are encoded while the system CLOCK signal is low and supplied as inputs to bus driver 27. On the next rising edge of the system CLOCK signal, bus drivers 27 transfer the encoded event signals to the IFB 24 (a second stage of the pipeline) which logically ANDs the outputs of all bus drivers 27 connected to the same IFB line and delivers the results to the signal detectors 29 while the clock signal is high. By the next falling edge of the system CLOCK signal, the signal detectors 29 have stored and forwarded the signals carried on the IFB 24 to PLD 26 (a third stage of the pipeline) and while the CLOCK signal is low, PLD 26 decodes the data received from sgnal detectors 29 and provides the resulting TRG signals as input to flip-flop 66 of FIG. 6. On the next rising edge of the system CLOCK signal, flip-flop 66 passes the TRG signal to logic circuitry within the triggering synchronizer 28 (a fourth stage of the pipeline) which subsequently sets the TRIGGER signal state either asynchronously or synchronized to the CLK signal from the triggerable device. Thus it is seen that event data is "pipelined" through the four stages of distributed logic synchronized to the system CLOCK signal. This pipelining enables the system to detect and respond to events at a high rate since more than one set of successive event indicating signals may be processed in the pipeline at any given time.

It is possible to eliminate signal detectors 29 of FIG. 1 and flip-flop 66 of FIG. 6; however, this reduces the frequency at which the system CLOCK signal may be operated and therefore reduces the speed with which the system can detect and respond to events. By eliminating signal detectors 29 and flip-flop 66, signals produced by bus drivers 27 on the rising edge of the system CLOCK signal must be processed all the way through IFB 24, PLD 26 and trigger synchronizer 28 during a single system CLOCK signal cycle. Thus, the period of the system CLOCK signal must be made relatively longer to ensure that incoming event indicating signals are completely processed through the system before processing of new incoming event indicating signals commences. Since the event indicating signals produced by event detectors 14 would be "sampled" by the event synchronizers 16 less frequently, system response time to event occurrence would be reduced, and the ability of the system to recognize short-lived patterns of events would also be reduced. However, in the multistage "pipeline" system of the present invention, the system CLOCK signal period need be no longer than the time signals require to propalonger gate through the "slowest" stage of the pipeline, IFB 24.

The operating frequency of the system is further improved by the use of bus drivers 27 which help to reduce the time required for signals to propagate through IFB 24 with respect to the propagation time for signals in a system utilizing, for example, open collector OR gates and passive pull up resistors. The IFB lines have capacitance which must be charged in order to drive the voltage on the lines to a high logic level, and the charging current supplied by passive pull up resistors in an open collector system is typically not sufficient to rapidly charge the bus capacitance. Thus, in a system utilizing open collector OR gates and pullup resistors instead of bus drivers 27, there is a relatively long delay between the time the output of an open collector OR gate goes high and the time that PLD 26 detects a resulting change in logic state of a signal on an IFB 24 line. Since bus drivers 27 use active devices to drive the IFB 24 lines high, they can supply a relatively large amount of charging current to the bus and the signal propagation delay time due to bus capacitance charging is substantially reduced. Thus the combination of multi-level programmability, multistage pipelining, and active driving of interconnecting bus lines to minimize bus capacitance charging time, provides an event combination and distribution system which minimizes the amount of wiring needed to interface event detectors and triggerable devices mounted in separate component modules and yet permits high resolution event detection and fast triggering response to changes in events.

In the preferred embodiment of the invention, separate equipment modules are mounted in a common mainframe and the interim function bus is provided as back plane wiring interconnecting the modules. Since the maximum length of interim function bus 24 which can be utilized to interconnect separate equipment modules is limited when high frequency operation is required, it is usually preferable to provide a separate event distribution and combination system, including a separate interface bus within each mainframe of a multiple-frame system and to provide a set of TRIGGER signal outputs from each mainframe as event signal inputs to the other mainframes. The unidirectional TRIGGER signals are more easily adapted for long distance transmission than the bi-directional IFB bus signals and since each TRIGGER signal output of a mainframe can represent any selected combination of event inputs to the mainframe, a group of TRIGGER signals transmitted to another mainframe can be encoded to efficiently carry triggering information between mainframes in much the same way that the IFB bus is encoded to efficiently carry triggering information between modules within a mainframe. Thus the present invention is easily adapted for efficiently communicating event information between mainframes as well as between modules within a single mainframe.

While a preferred embodiment of the present invention has been shown and described it will be apparent to those skilled in the art that many changes and modifications may be made without departing from the invention in its broader aspects. For example, while the preferred embodiment of the invention is intended for use with a fourteen line interim function bus 24, other embodiments of the invention may employ other numbers of IFB lines. Similarly, while event signals are applied to each PLD 18 in groups of six, other group sizes are possible. The appended claims are therefore intended to cover all such changes and modifications as fall within the true spirit and scope of the invention.

I claim:

1. An apparatus for generating a trigger signal in response to a set of event indication signals, a state of each of said event indication signals indicating a state of occurrence of a corresponding event, comprising:
   encoding means for generating event encoding signals, the state of each event encoding signal being determined according to states of a corresponding subset of said event indication signals;
   a plurality of conductors, each for carrying a separate bus signal of a selective one of first and second states;
   means for generating a system clock signal of alternating third and fourth states; and
   a plurality of bus drivers, each corresponding to a separate one of said event encoding signals, each of said plurality of conductors corresponding to at least one of said bus drivers, each bus driver comprising means for actively driving the bus signal carried by the corresponding conductor to said first state when said system clock signal is of said third state, and for actively driving the bus signal carried by said corresponding conductor to said second state when said clock signal changes to said fourth state and the corresponding event encoding signal is of a particular state.

2. The apparatus according to claim 1 wherein said encoding means comprises:
   event synchronizer means for generating synchronized event signals, one synchronized event signal corresponding to each said event indication signal, when said system clock signal changes to said third state, each synchronized event signal being of state determined according to the state of the corresponding event indication signal; and
   encoding logic means for generating said event encoding signals, the state of each event encoding signal being determined according to a logical combination of states of said synchronized event signals.

3. An apparatus according to claim 2 wherein said encoding logic means comprises:
   a first plurality of enable circuits, each generating an enable circuit output signal in response to a separate one of said synchronized event signals and a first four-state programming control signal, the state of the output signal being the same as the state of said synchronized event signal when the first programming control signal is of a first state, of a state opposite to the state of the synchronized event signal when the first programming control signal is of a second state, of a high logic level when the first programming control signal is of a third state, and of a low logic level when the first programming control signal is of a fourth state; and
   a plurality of logic gates, one corresponding to each of said event encoding signals, each for logically combining output signals of said programmable enable circuits to produce a logic gate output signal.

4. An apparatus according to claim 3, wherein said first programming control signal comprises a binary enable signal and a binary sense signal, the collective states of said binary enable and sense signals defining the state of said first programming control signal, and wherein at least one of said first plurality of enable circuits comprises:
   a NAND gate for producing an output signal in response to said synchronized event signals and said enable signal as inputs; and
   an XNOR gate, having the output signal of said NAND gate and said sense signal as inputs, for generating an enable circuit output signal.

5. The apparatus according to claim 3, wherein said programmable encoding circuit further comprises a second plurality of enable circuits, each generating one event encoding signal in response to an output signal produced by a separate one of said logic gates and a second four-state programming control signal, the state of the event encoding signal being the same as the state of said one logic gate output signal when the second programming control signal is of a first state, of a state opposite to that of the state of said logic gate output signal when the second programming control signal is of a second state, of a high logic level when the second programming control signal is of a third state, and of a low logic level when the second programming control signal is of a fourth state.

6. An apparatus according to claim 5, wherein said second programming control signal comprises a binary enable signal and a binary sense signal, the collective states of said binary enable and sense signals defining the state of said second programming control signal, and wherein at least one of said second plurality of enable circuits comprises:

a NAND gate for producing an output signal in response to said one logic gate output signal and said enable signal as inputs; and an XNOR gate having the output signal of said NAND gate and said sense signal as input for generating an event encoding signal.

7. The apparatus according to claim 1, further comprising decoding means for generating said trigger signal following detection of a predetermined pattern of bus signal states appearing on said conductors.

8. The apparatus according to claim 7, wherein said decoding means comprises:

signal detector means corresponding to each said conductor, each signal detector means for generating an output signal of state set indicating whether the bus signal carried by the corresponding conductor has changed to said second state since said system clock signal last changed to said fourth state;

decoding logic means for generating a trigger initiating signal of state determined according to a logical combination of states of signal detector means output signals; and trigger synchronizing means for generating said trigger signal according to the state of said trigger initiating signal when said system clock signal changes to said fourth state.

9. An apparatus according to claim 8, wherein said decoding logic means comprises:

a first plurality of enable circuits, each for generating an enable circuit output signal in response to a corresponding one of the signal detector means output signals and in response to a four-state programming control signal, the state of the enable circuit output signal being the same as the state of the corresponding signal detector, means output signal when the programming control signal is of a first state, of a state opposite to the state of the corresponding bus synchronizer means output signal when the programming control signal is of a second state, of a high logic level when the programming control signal is of a third state, and of a low logic level when the programming control signal is of a fourth state; and a logic gate for logically combining the output signals of said enable circuits to produce said decoded signal.

10. An apparatus according to claim 9, wherein said programming control signal comprises a binary enable signal and a binary sense signal, the collective states of said binary enable and sense signals defining the state of said programming control signal, and wherein each of said first plurality of enable circuits comprises:

a NAND gate for producing an output signal in response to a signal detector output signal and said enable signal as inputs; and an XNOR gate, having the output signal of said NAND gate and said sense signal as inputs, for generating an enable circuit output signal.

11. An apparatus for generating a trigger signal in response to a set of event indication signals, a state of each of said event indication signals indicating a state of occurrence of a corresponding event, comprising:

a plurality of conductors, each for carrying a separate bus signal of selectively one of first and second states;

means for generating a system clock signal of alternating third and fourth states;

event synchronizer means for generating synchronized event signals when said system clock signal changes to said third state, each synchronized event signal being of state determined according to the state of a corresponding event indication signal;

encoding logic means for generating event encoding signals, the state of each event encoding signal being determined according to a logical combination of states of said synchronized event signals;

a plurality of bus drivers each corresponding to a separate one of said event encoding signals and each conductor corresponding to at least one of said bus drivers, each bus driver comprising means for actively driving the bus signal carried by the corresponding conductor to said first state when said system clock signal is of said third state, and for actively driving the bus signal carried by said corresponding conductor to said second state in response to one state of the corresponding event encoding signal when said clock signal changes to said fourth state; and decoding means for generating said trigger signal following detection of a predetermined pattern of bus signal states appearing on said conductors.

12. An apparatus for generating a trigger signal in respons to a selected pattern of event indicating signals, comprising:

means for generating a sequence of clock signal pulses, each clock signal pulse having a first and a second edge;

event synchronizing means for generating event signals on the first edge of each clock signal pulse, the state of each synchornized event signal indicating the current state of a corresponding event indicating signal;

encoding means for generating event encoding signals of state set according to a logical combination of states of said synchronized event signals;

a bus comprising conductors;

bus driver means for actively driving the potential of each conductor of the bus to a first state on said first edge of each clock signal pulse and for actively driving the potential of selected conductors of the bus to a second state on said second edge of each clock signal pulse, the conductors being selected according to current states of said event encoding signals generated by said encoding means;

signal detector means for generating output signals of states indicating whether the potential of each conductor of the bus has changed to said second state following the second edge of a last generated clock signal pulse;

decoding means for generating a trigger initiating signal following detection of a predetermined pattern of signal detector means output signal states; and trigger synchronizing means for generating a trigger of state set according to the state of said trigger initiating on said second edge of each of said clock pulses.

* * * * *